Dec. 17, 1935. E. A. ARP 2,025,008

CONNECTING ROD AND PISTON TESTING AND ALIGNING DEVICE

Filed Nov. 2, 1932 4 Sheets-Sheet 1

Inventor
Ewald A. Arp.
By Reif + Braddock
Attorneys.

Dec. 17, 1935.  E. A. ARP  2,025,008
CONNECTING ROD AND PISTON TESTING AND ALIGNING DEVICE
Filed Nov. 2, 1932  4 Sheets-Sheet 2
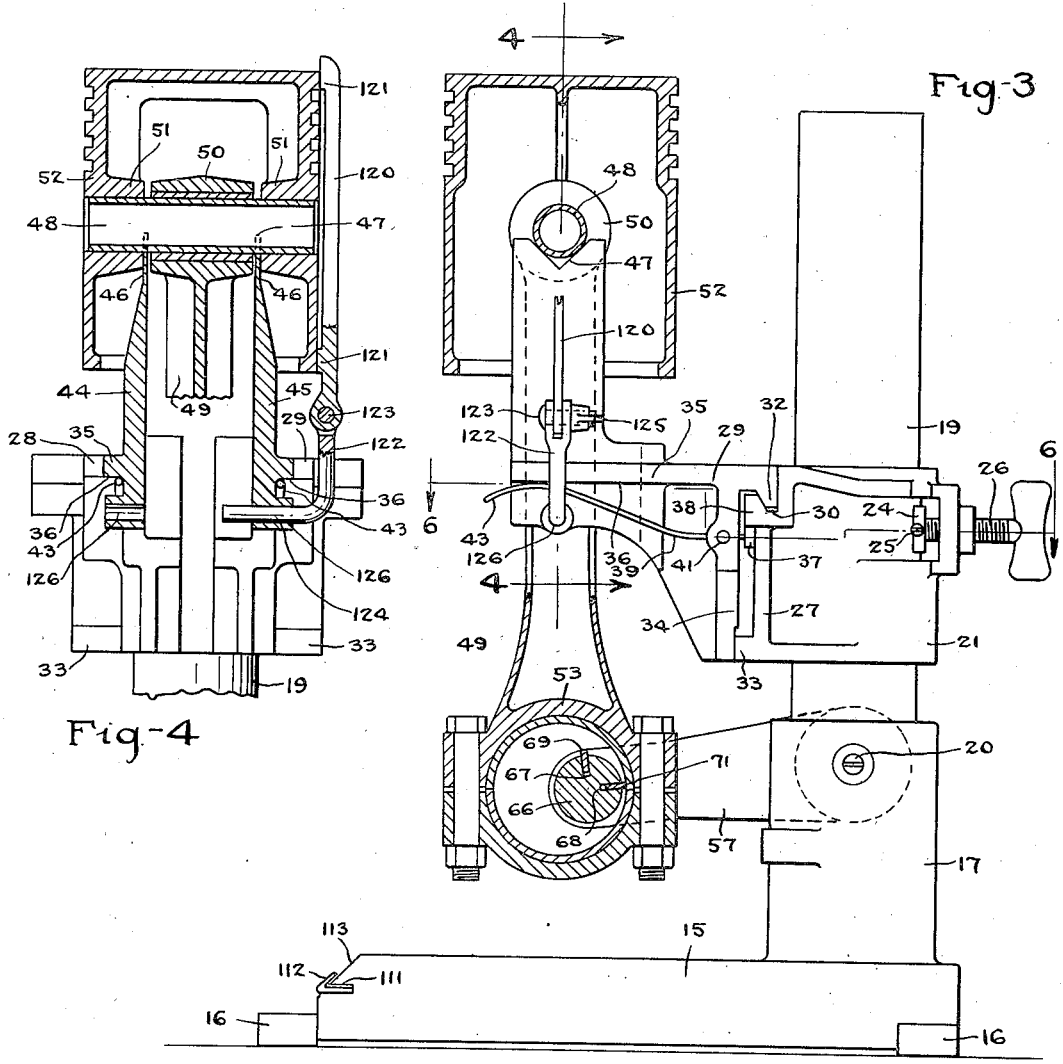
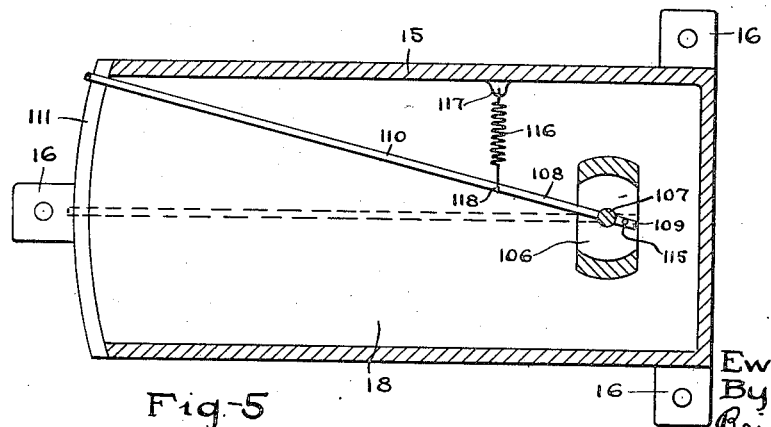
Inventor:
Ewald A. Arp
By
Reif & Braddock
Attorneys.

Dec. 17, 1935.  E. A. ARP  2,025,008
CONNECTING ROD AND PISTON TESTING AND ALIGNING DEVICE
Filed Nov. 2, 1932  4 Sheets-Sheet 3

Inventor:
Ewald A. Arp.
By Reif & Braddock
Attorneys.

Dec. 17, 1935. E. A. ARP 2,025,008
CONNECTING ROD AND PISTON TESTING AND ALIGNING DEVICE
Filed Nov. 2, 1932 4 Sheets-Sheet 4
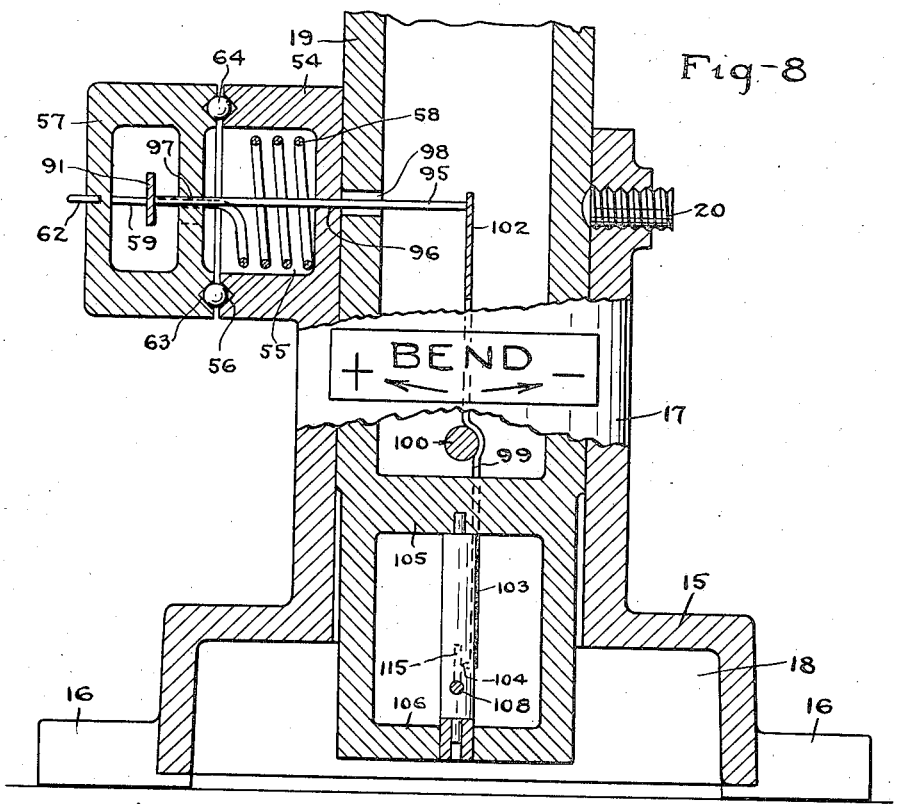
Fig-8
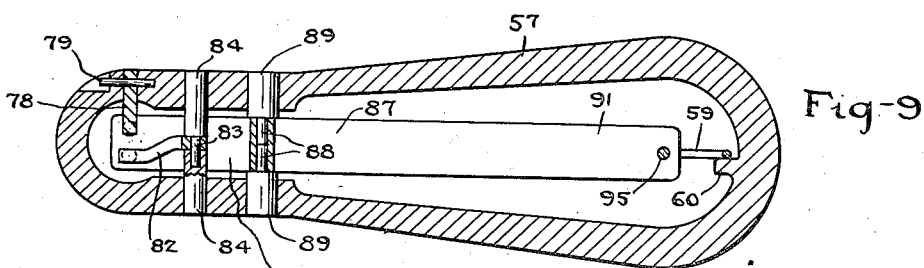
Fig-9
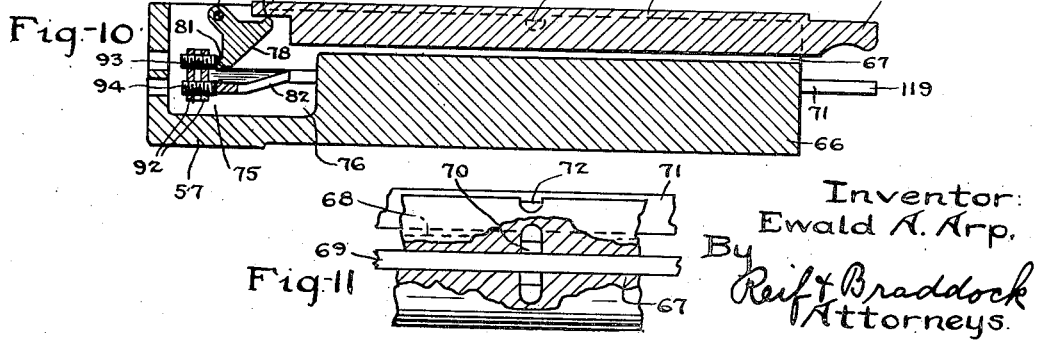
Fig-10
Fig-11
Inventor:
Ewald A. Arp.
By Reif & Braddock
Attorneys.

Patented Dec. 17, 1935

2,025,008

UNITED STATES PATENT OFFICE 2,025,008

CONNECTING ROD AND PISTON TESTING AND ALIGNING DEVICE

Ewald A. Arp, Minneapolis, Minn., assignor to Storm Manufacturing Co., Inc., Minneapolis, Minn.

Application November 2, 1932, Serial No. 640,753

18 Claims. (Cl. 33—180)

This invention relates to a connecting rod and piston testing and aligning device adapted for use to readily and dependably check the accuracy and parallelism of connecting rod bearings and their perpendicularity to pistons.

An object of the invention is to provide a novel and improved device of the present character which will be adapted to check the accuracy and parallelism of the bearings of an engine connecting rod either when attached to or removed from a piston.

A further object is to provide a connecting rod testing device which will include mechanism of novel and improved construction for accurately checking an engine connecting rod as to both bend and twist thereof.

A further object is to provide a connecting rod testing device for checking both bend and twist of a rod by operations performed directly upon a rod and the wrist pin thereof wholly independently of a piston in which said wrist pin is, or may be, mounted.

A still further object is to provide a connecting rod and piston testing and aligning device which will include novel and improved mechanism adapted to operate upon a connecting rod independently of a piston to check said rod for both bend and twist, and will also include novel and improved mechanism adapted to operate upon a piston to which said rod is attached to check the perpendicularity of said rod to said piston.

And a still further object is to provide a device of the present character wherein will be incorporated improved features and characteristics of construction, novel both as individual entities of said device and in combination.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 3 is an elevational view of the device showing parts thereof in vertical section;

Fig. 4 is a vertical sectional view detailing features of the device, taken substantially as on line 4—4 in Fig. 3;

Fig. 5 is a horizontal sectional view, taken substantially as on line 5—5 in Fig. 2;

Fig. 8 is an enlarged, fragmentary vertical sectional view, taken substantially as on line 8—8 in Fig. 2;

Fig. 9 is a detail sectional view, taken substantially as on line 9—9 in Fig. 7;

Fig. 10 is a detail sectional view, taken substantially as on line 10—10 in Fig. 7; and Fig. 11 is a fragmentary view, partially in elevation, partially in section and partially broken away, detailing the contact elements of the device and the manner of mounting said contact elements.

Figure 7:
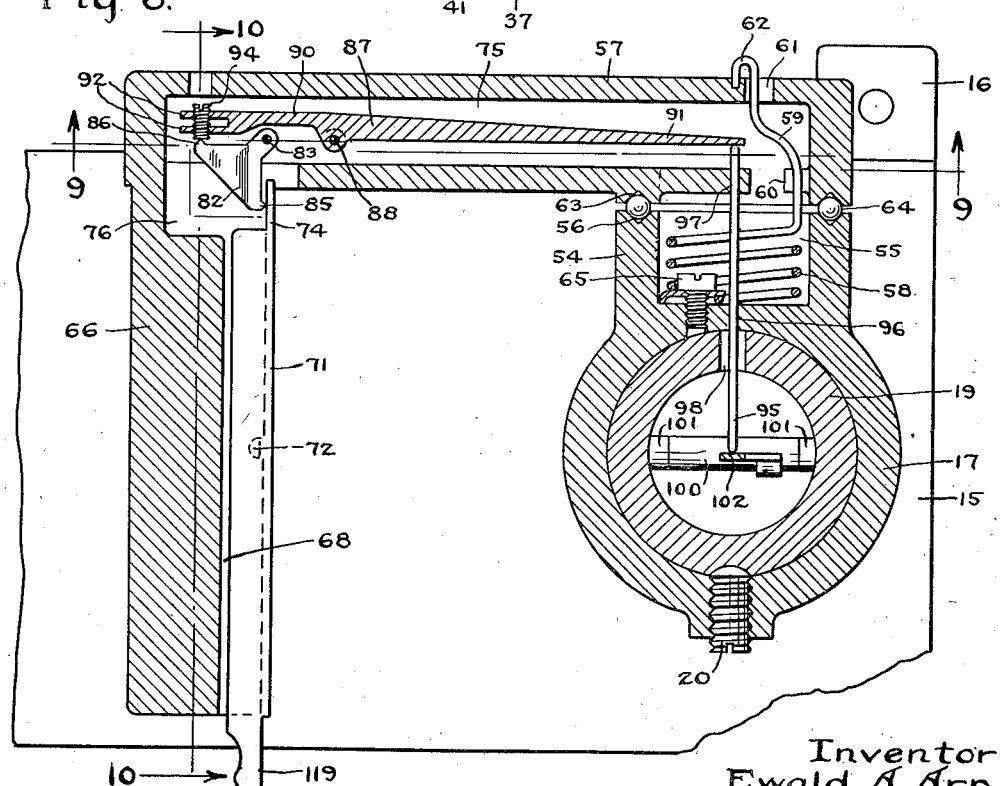
Fig. 7 is an enlarged horizontal sectional view taken substantially as on line 7—7 in Fig. 2.

With respect to the drawings and the numerals of reference thereon, 15 represents the base of the device which may rest upon or against a surface, and 16 designates apertured ears on said base for attaching the base to said surface. The base 15 is of general hollow, rectilinear conformation as disclosed, including an upstanding cylindrical portion 17 at one end thereof with which the hollowed out portion 18 of said base is in communication. The upstanding cylindrical portion 17 of the base 15 slidably receives a vertical hollow post or standard 19 which is held against movement in said upstanding cylindrical portion by means of a locking screw 20 set into the portion 17 and engaging the post or standard 19, as best shown in Figs. 7 and 8.

The post or standard 19 adjustably supports a vertically slidable sleeve bracket 21 which is adapted to be locked at adjusted elevation upon said post or standard by means of a key 22 adapted to engage in a longitudinal key slot 23 in the post or standard. As disclosed, the key slot 23 is of V-shape, as is also the key 22, and said key is integral with a locking bar 24 and at the mid-length thereof. The locking bar 24 includes right-angle ears at its opposite ends slotted to receive small screws 25 for slidably attaching the locking bar to the sleeve bracket 21, and said sleeve bracket is tapped to receive a winged locking screw 26 adapted to be turned home against the rear surface of the locking bar 24 at the location of the key 22 to force said key into the key slot 23, to thus lock the slidable sleeve to the vertical post or standard. The sleeve bracket 21 is locked to the post or standard 19 against both turning and longitudinal movement to situate a forward wall 27 of said sleeve bracket in a vertical plane which extends transversely with relation to the base 15.

Figure 1:
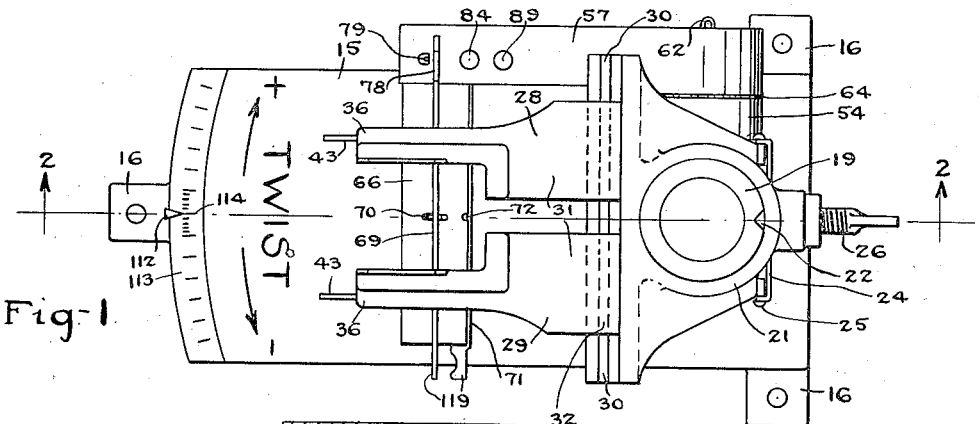
Fig. 1 is a plan view of a device in which the features and characteristics of the invention are incorporated.
Figure 2:
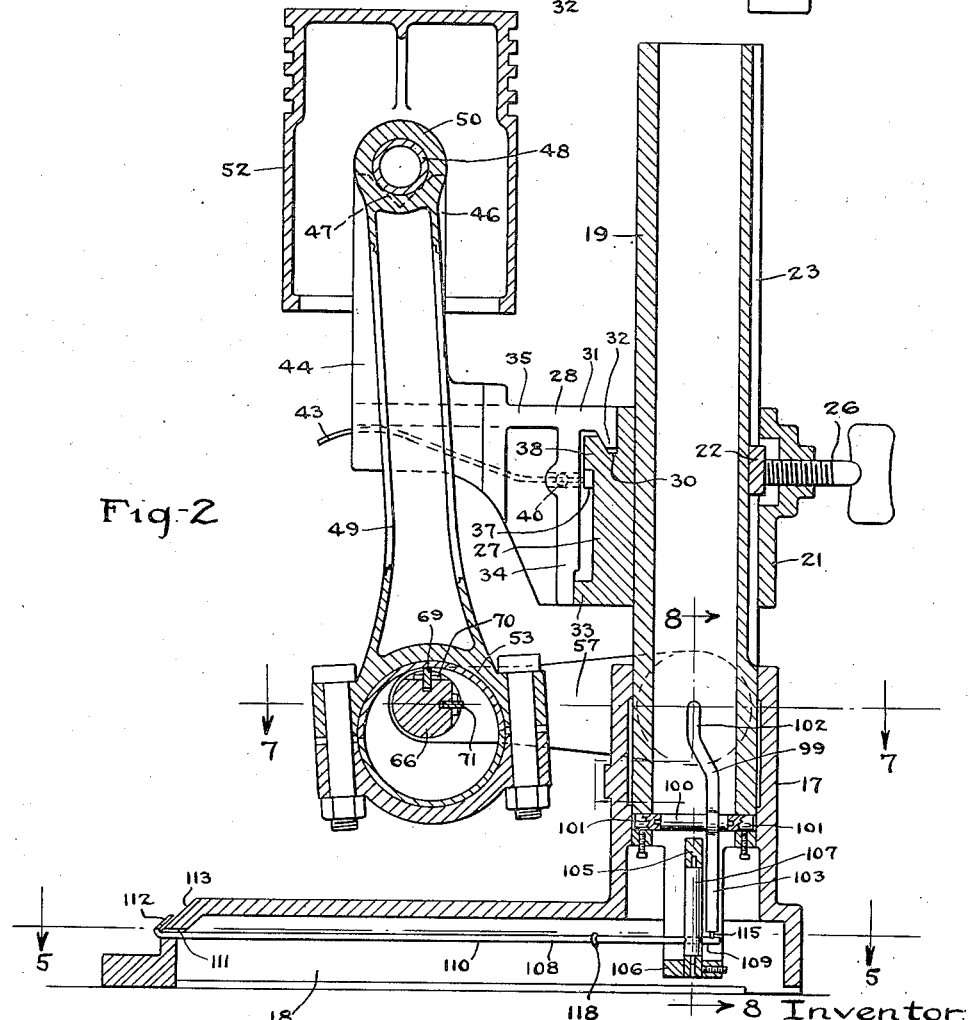
Fig. 2 is a vertical sectional view of the device, taken substantially on line 2—2 in Fig. 1.
Figure 6:
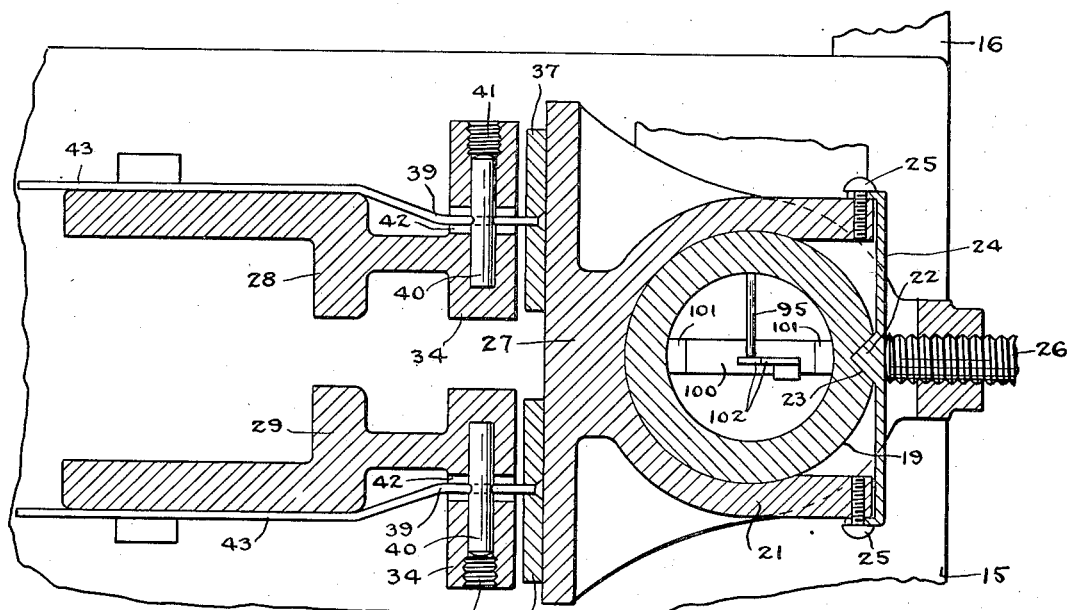
Fig. 6 is an enlarged horizontal sectional view, taken substantially on line 6—6 in Fig. 3.

The vertical wall 27 of the sleeve bracket 21 slidably carries a pair of connecting rod supports, denoted 28 and 29, respectively, which connecting rod supports are adjustable in a horizontal plane along said vertical wall 27, toward and from each other. As disclosed, an upper portion of the wall 27 includes a horizontal slot or grove 30 of V-shape extending from side to side of said wall, and each connecting rod support 28 and 29 includes an overhanging wall 31 with downwardly extending V-flange 32 slidably fitted to the V-shape groove 30. A lower portion of the vertical wall 27 includes a horizontal, forwardly projecting ledge or shelf 33 with smooth front face against which a rearward, lower portion of a vertical wall 34 of each connecting rod support slidably engages, as best shown in Figs. 2 and 3, the arrangement being such as to cause each connecting rod support 28 and 29 to be positioned with an upper wall 35 thereof in a horizontal plane and directly above the base 15, closer to or farther from the transverse center of said base, depending upon the positions to which said connecting rod supports may be adjusted along the forward wall of the sleeve bracket 21. Said upper wall 35 of each connecting rod support 28 and 29 provides a ledge 36 at the outer, under side of each said wall 35. Means for fastening each connecting rod support at adjusted position along the wall 27 consists, as disclosed, of a locking plate 37, one for each support, adapted to be yieldingly forced up against the under surface of a forward, upper shoulder 38 of said vertical wall 27, each locking plate 37 being carried by a rod or wire 39 attached to an intermediate portion of the locking plate and fixed upon an axis or pivot pin 40 (see Fig. 6) disposed horizontally in the vertical wall 34 of the corresponding connecting rod support. Each pivot pin 40 is held in its support by a retaining screw 41, and clearance 42 is provided for passage of each rod or wire 39 through the corresponding vertical wall 34. Each rod or wire 39 extends for a considerable distance from its pivot pin 40 at the side of said pivot pin opposite the corresponding locking plate 37, as indicated at 43, and the portion 43 of each rod or wire 39 is adapted to be fitted beneath the corresponding ledge 36 to thus yieldingly urge the corresponding locking plate 37 up against the under surface of the shoulder 38 and clamp the connecting rod support against sliding movement relatively to the sleeve bracket 21, as will be understood. To release the connecting rod supports in order that they may be slid along the sleeve bracket, the portions 43 of the rods or wires 39 are released from beneath the ledges 36, to thus remove the upward tension from the locking plates 37.

Each connecting rod support 28 and 29 includes an integral, or otherwise attached, vertically disposed, upwardly extending wrist pin engaging element, denoted 44 and 45, respectively, each of which wrist pin engaging elements is of reduced or knife edge thickness at its upper portion, as indicated at 46. The reduced or knife edge portions 46 of the wrist pin engaging elements 44 and 45 are disposed parallelly to each other, as will be clear from the drawings, and, as disclosed, each portion 46 is cut to V-shape at its upper portion, as represented at 47, the V-shape portions 47 lying directly opposite each other in a horizontal plane and along a vertical plane which extends transversely of the base 15. As will be more clear from Figs. 2, 3 and 4, the V-shape portions 47 of the connecting rod supports provide reduced or knife edge receiving elements for the wrist pin, indicated at 48, of a connecting rod 49, said V-shape portions 47 engaging about the lower portion of said wrist pin, between the wrist pin bearing 50 of the connecting rod 49 and each hub 51 of a piston 52 mounted upon said wrist pin, to thus suspend said connecting rod 49 in a vertical plane between and parallel with the reduced or knife edge portions 46, provided said connecting rod and its wrist pin bearing are in proper, perpendicular relation to each other. A purpose of providing for adjustment of the connecting rod supports 28 and 29 toward and from each other along the vertical wall 27 is obviously to position the V-shape portions 47 of the connecting rod supports in properly spaced relation to be fitted upon a wrist pin, such as 48, at the opposite ends of a wrist pin bearing, such as 50, of varying length, and between the wrist pin bearing and the hubs, such as 51, of a piston, such as 52, mounted upon said wrist pin. A further purpose of providing for adjustment of the connecting rod supports along the vertical wall 27 is to cause the main bearing 53 of a connecting rod, such as 49, suspended from said supports to be disposed in the most advantageous position above the base 15, desirably at or adjacent to a vertical plane passing longitudinally through the transverse center of said base, for accurate checking of the parallelism of the main and wrist pin bearings of said connecting rod, in the manner to be fully explained.

The upstanding cylindrical portion 17 upon the base 15 integrally supports an annular, horizontally disposed member 54, which member is hollow, as indicated at 55, and is desirably located in a vertical plane extending transversely of the base 15. The outer end of the member 54 provides a surface lying in a vertical plane parallel to a vertical plane extending longitudinally of said base 15, and said mentioned surface is provided with a ball raceway 56.

A hollow arm 57, which is as disclosed of general tapered configuration, has one end thereof rotatably attached to the hollow member 54, and said arm 57 extends from said member 54 toward a suspended connecting rod 49, in a vertical plane disposed parallel to a vertical plane passing longitudinally through the base 15. Obviously, the arm 57 is mounted for vertical swinging movement. As disclosed, the chamber 55 of the member 54 contains a coil spring 58 one end of which rests upon the base of said chamber, constituted by the wall of the cylindrical portion 17, and the other end portion 59 of which extends through the adjacent end portion of the arm 57. Said arm 57 includes a lug 60 at its end against which the portion 59 of the coil spring 58 rests, and the outer end of said portion 59 passes through a slot 61 in the outer wall of the arm 57 and includes a hook 62 engaged against the outer surface of said wall. The arm 57 includes a ball raceway 63 which is arranged opposite the ball raceway 56, and ball bearings 64 are disposed in said raceways 56 and 63, as more clearly shown in Figs. 7 and 8. The coil spring 58 is attached to the cylindrical wall 17 and at the base of the chamber 55 by a small screw 65. Evidently, the coil spring 58 effectively and resiliently holds the arm 57 to the member 54. The arrangement is such that when the arm 57 is rotated from an upper to a lower position, the lug 60 acts upon the coil spring to wind up its coil. Thus, said coil spring acts as a counterbalance for the hollow arm 57. It will, of course, be understood that the force exerted by the coil spring 58 is in direction to draw the bearing surface of the arm 57 against the bearing surface of the member 54. It should be remarked that the hook 62 is desirably situated axially of the bearing for the arm 57.

The end of the hollow arm 57 which is opposite its bearing just described, integrally, or otherwise, supports a horizontal contact element carrying member 66 disposed perpendicularly to said hollow arm 57 and extending transversely of the base 15, as best shown in Figs. 1, 2, 3, 7 and 10, above said base. Said member 66 includes longitudinal slots, represented 67 and 68, respectively, arranged at 90° apart, the slot 67 desirably being positioned in the upper surface of said member, and the slot 68 as disclosed being arranged at the side of the member adjacent the cylindrical portion 17. As shown, the member 66 is circular in cross-section, but could be of other configuration.

The slot 67 has therein a contact element or blade 69 which is pivotally supported at its midlength, as denoted at 70, in said slot in spaced relation to the base thereof. The slot 68 has therein a contact element or blade 71 which is also pivotally supported at its midlength, as denoted at 72, in said slot in spaced relation to the base thereof.

An end portion, denoted 73 and 74, respectively, of each of the contact elements or blades 69 and 71 is of reduced dimension and extends to position adjacent the concavity 75 of the arm 57 at the outer end of said concavity. The member 66 is cut away as at 76 adjacent the concavity 75.

A triangularly shaped piece or member 78 is pivotally mounted at one of its corners or apices upon a horizontal pin 79 parallel to the pin 70 and suitably arranged in the upper wall of the hollow arm 57, as more clearly disclosed in Figs. 9 and 10. The piece or member 78 includes a knife edge 80 at a corner or apex thereof adjacent the pin 79 which is engaged by the end portion 73 of the contact element or blade 69. The third corner or apex of said triangular piece includes a knife edge 81 adjacent the pin 79 and the knife edge 80 for a purpose to be described.

A triangularly shaped piece or member 82 is pivotally mounted at one of its corners or apices upon a vertical pin 83 parallel with the pin 72 and suitably carried by pegs 84 fixed in the upper and lower walls of the hollow arm 57, as more clearly disclosed in Figs. 7 and 9. The piece or member 82 includes a knife edge 85 at a corner or apex thereof adjacent the pin 83 which is engaged by the end portion 74 of the contact element or blade 71. The third corner or apex of said triangular piece 82 includes a knife edge 86 adjacent the pin 83 and the knife edge 85 also for a purpose to be described.

An intermediate operating lever of the device, designated 87, is mounted in the concavity 75 of the arm 57 upon a vertical pin 88 suitably carried by pegs 89 also fixed in the upper and lower walls of said arm 57. Said lever 87 includes a shorter leg 90 situated adjacent the triangularly shaped pieces or members 78 and 82, and a longer leg 91 which extends into the end portion of the concavity 75 adjacent the horizontal hollow member 54.

The shorter leg 90 of the lever 87 is split or bifurcated at its free end, to provide spaced, parallel, vertically disposed ears 92 which are tapped to receive an upper and a lower adjusting screw, represented 93 and 94, respectively, engaged by the knife edges 81 and 86, respectively. The adjusting screws 93 and 94 are horizontally disposed. The lever 87 is composed of resilient material, and the ears 92 are sprung toward each other before the screws 93 and 94 are inserted in the tapped openings. Thus the screws are frictionally grasped to be held against accidental turning movement in said ears 92, as will be understood.

A horizontal operating rod 95 of the device is mounted adjacent its midlength, as at 96, in an opening through the cylindrical member 17 and adjacent its outer end, as at 97, in an opening through the wall of the arm 57 which is adjacent said cylindrical member 17, to be longitudinally slidable. The vertical post or standard 19 is cut away, as at 98, to afford clearance for said horizontally slidable rod 95. The outer end of the operating rod 95 engages against the adjacent surface of the leg 91 of the lever 87 at location close to the free end of said leg 91.

A second intermediate operating lever of the device, represented 99, is mounted in the hollow post or standard 19, said lever being soldered or otherwise attached at or adjacent its midlength to a horizontal pin 100 suitably mounted in bearings 101 carried by opposite portions of the wall of said post or standard. Said lever 99 includes an upper leg 102 with which the adjacent end of the horizontal rod 95 engages, and a lower leg 103 which has a knife edge 104 at or adjacent its lower portion and arranged at the side of said lower leg adjacent the rod 95, said knife edge 104 being for a purpose to be made clear.

The hollow post or standard 19 includes a bottom extension providing an upper and a lower horizontal web, denoted 105 and 106, respectively, which webs suitably and rotatably carry a vertical pin 107 desirably arranged axially of the cylindrical portion 17 and at the side of the lower leg 103 of the lever 99 adjacent a connecting rod to be tested. It will be noted that the rod 95 extends radially of the post or standard 19, and that the upper leg 102 of the lever 99 is offset to engage said rod, the lower leg 103 of said lever 99 being disposed toward the side of said post or standard 19 which is opposite the connecting rod and the mechanism of the device for operating upon said connecting rod.

The vertical pin 107 fixedly carries a pointer arm 108 which is horizontally disposed in the hollowed out portion 18 of the base 15. As disclosed, said pointer arm 108 passes through the rotatable pin 107, and includes a relatively short leg 109 at the side of said pin 107 adjacent the leg 103 of the lever 97, just below said leg 103. The pointer arm 108 also includes a relatively long leg 110 which extends through a horizontal slot 111 in the end portion of the base 15 which is opposite the cylindrical portion 17, and the outer end of said long leg 110 includes an angularly disposed, upturned pointer 112 arranged to travel over and above a calibrated surface 113 upon said end portion of the base 15 spaced from said cylindrical portion. In the practical operation of the device the calibrated surface 113 would include zero at its midlength, designated 114. For convenience the measurements at either side of zero can be represented plus or minus, as shown, or in any other preferred way. The surface 113 would be calibrated in practice to denote extremely small fractions of an inch, as, for example, one-thousandth of an inch, or other desired measurement.

The short leg 109 of the pointer arm 108 integrally or otherwise carries an upstanding lug or protuberance 115 which is engaged by the knife edge 104 upon the lower leg 103 of the lever 99.

A coil spring 116 in the hollowed out portion 18 of the base 15 and having one of its ends 117 attached to a side wall of said base and its other end 118 attached to the long leg 110 of the pointer arm 108, gives said pointer arm a bias normally resiliently holding the pointer 112 at one end of the slot 111 and the surface 113, as more clearly shown in Fig. 5. Also, due to the action of said coil spring 116, the lug or protuberance 115 is yieldingly held against the knife edge 104, to thus hold the leg 102 of the lever 99 against the rod 95, and to in turn hold said rod against the leg 91 of the lever 87, the screws 92 and 93 in the leg 90 of said lever 87 against the triangular pieces 78 and 82, respectively, and said triangular pieces against the end portions 73 and 74 of the contact elements or blades 69 and 71, respectively, so that, normally, said contact elements or blades 69 and 71 are not exactly parallel with the carrying member 66 therefor, but have their legs including the end portions 73 and 74 swung outwardly slightly and their opposite legs swung inwardly. The arrangement is such that when either contact element or blade 69 or 71 is positioned to be exactly parallel to the carrying member 66, the pointer 112 is situated at zero upon the calibrated surface 113.

It will be noted that even though the triangularly shaped pieces 78 and 82 are mounted in right-angular relation to each other, each of said pieces is so disposed that when operated upon by the corresponding contact element or blade, there will be imparted through the piece to the shorter leg 90 of the lever 87 a force tending to swing the longer leg 91 of said lever 87 in direction toward the horizontally slidable rod 95.

In practice, a connecting rod to be checked for bend and twist is suspended upon the V-knife edges 47 in the manner already fully described, the main bearing 53 of said connecting rod having been first disposed over the contact element carrying member 66, as in Figs. 2 and 3. To check the suspended connecting rod for bend, the hollow arm 57 is swung upwardly, as in Fig. 2, to bring the contact element or blade 69 into engagement with the internal surface of the main bearing 53. Provided there is no bend in the connecting rod being tested, the internal surface of said main bearing 53 which is engaged by said element or blade 69 will obviously be exactly horizontal to cause said element or blade 69 to be swung to exactly horizontal position, and thus exactly parallel to the horizontal carrying member 66, to in turn bring the pointer 112 to zero position. If there is bend in the connecting rod being tested, the engaged internal surface of said main bearing 53 will be away from the horizontal, in one direction or the other, to tilt the element or blade 69 in corresponding direction and like degree, the magnitude of the bend being denoted by the pointer 112 at the plus or minus of zero, depending upon the direction of the bend. To check the suspended connecting rod for twist, said rod is swung in direction away from the post or standard 19, as shown in Fig. 3, to bring the internal surface of the main bearing 53 into engagement with the contact element or blade 71. Provided there is no twist in the connecting rod being tested, the internal surface of said main bearing which is engaged by said element or blade 71 will lie exactly parallel to the member 66 to thus obviously cause said element or blade 71 to be swung to position exactly parallel to said member 66 and bring said pointer 112 to zero position. If there is twist in the connecting rod being tested, the engaged internal surface of said main bearing 53 will be out of parallel with the member 66, in one direction or the other, to tilt the element or blade 71 in corresponding direction and like degree, the magnitude of the twist being denoted by the pointer 112 at the plus or minus side of zero, depending upon the direction of the twist.

The device is capable of very accurate adjustment by means of the screws 93 and 94, the adjustment in the instance of each contact element or blade 69 and 71 being accomplished, after one fashion, by first disposing the contact element or blade exactly parallel with the member 66, and while so holding said contact element or blade, turning the corresponding adjusting screw 93 or 94, as the case may be, to bring the pointer 112 to the zero position 114 upon the calibrated surface 113. Other methods of adjusting the device are evidently possible.

The device could of course be so constructed that the contact elements or blades 69 and 71 would normally be parallel to the member 66 and the pointer 112 as a consequence would normally be at zero, but the arrangement as illustrated and described is preferable.

It may happen that the main bearing of a connecting rod to be tested has an internal circumferential surface which is of smaller diameter at the central portion thereof and tapers outwardly from said central portion to be of larger diameter near the ends of said internal circumferential surface. In such an event, the device of the invention will be employed by testing first one and then the other of said outwardly tapering surfaces, and then comparing the tests made. That is to say, one leg of the contact element or blade 69 or 71 will first be brought against one of the tapering surfaces of the bearing and the measurement resulting read upon the scale, say at the plus side thereof. Then the other leg of said element or blade 69 or 71 will be brought against the other tapering surface of said bearing and the measurement also read upon said scale, naturally at the minus side thereof. If these plus and minus measurements as made are equal in degree, the connecting rod is, obviously, accurate. If the plus and minus measurements are unequal in degree, in the case of either the test for bend or twist, the connecting rod is inaccurate, the magnitude of the difference in degree of the measurements directly indicating the magnitude of the bend or twist, as the case may be. In order that either leg of either contact element or blade 69 and 71 can be more readily placed against a tapered surface to be checked or tested, said elements or blades 69 and 71 are each provided with a finger piece 119 extending beyond the free end of the carrying member 66, the finger pieces being for more ready manual manipulation of the contact elements or blades.

The device also includes means for operating upon a piston, such as 52, to which a connecting rod, such as 49, is attached, to check the perpendicularity of the connecting rod to the piston, the checking operation upon said piston being performed while the wrist pin, such as 48, is suspending the connecting rod being tested upon the connecting rod supports 28 and 29 in the manner as illustrated and described. Said means for checking the perpendicularity of a connecting rod and piston is best disclosed in Figs. 3 and 4. As there shown, numeral 120 indicates a testing arm or plate including integral lugs 121 adjacent the opposite ends of the arm or plate and having outer flat surfaces lying in a single plane. An angularly shaped rod, which may desirably be circular in cross section, includes a leg 122 pivotally attached, as at 123, to one end of the testing arm or plate 120, and a leg 124 preferably extending at right-angles to the leg 122, said leg 124 being situated at the same side of the arm or plate 120 as are the lugs 121. The pivot or axis 123 includes a winged locking nut 125 for fixedly clamping the angularly shaped rod to said testing arm or plate. Each of the connecting rod supports 28 and 29 includes a horizontal socket 126 at the outer side thereof, said sockets 126 being arranged directly opposite each other, being adapted to snugly and removably receive the leg 124 of the angularly shaped rod, and desirably being disposed in a vertical plane extending diametrically through a supported piston, such as 52, at slightly spaced relation from said piston, naturally below the same.

To check the perpendicularity of a piston, the testing arm or plate 120 is moved to position causing the lugs 121 upon said arm or plate to engage the adjacent portion of the piston wall, near the opposite ends thereof, in a line extending longitudinally of said piston, and the leg 124 is, desirably simultaneously, inserted in the adjacent horizontal socket 126. With said lugs 121 so in engagement with the piston wall, said leg 124 is swung upon the pivot or axis 123 to its farthest inward position, as shown in Fig. 4, and the wing nut 125 is turned down to fasten the arm or plate 120 and the angularly shaped rod in fixed relation to each other. While so fastened, said arm or plate and rod are removed from the piston and the mentioned socket, and are associated, in the manner as set forth, with a diametrically opposite portion of the piston wall and with the opposite socket 126. That is to say, the leg 124 is inserted in said opposite socket 126, and the arm or plate 120 is moved toward said diametrically opposite portion of the piston while said arm or plate is arranged lengthwise of the piston. If then, when the arm or plate is moved to its closest possible relation to the piston without altering the fixed relation of said arm or plate and said rod, the outer flat surfaces of both lugs 121 nicely engage said piston, the piston is obviously perpendicularly and correctly mounted. If said lugs 121 do not then so engage the piston, said piston requires adjustment to perpendicularity, the amount and the nature of the adjustment necessary being indicated by the relation which the outer flat surfaces of the lugs bear to the piston, as will be obvious.

What I claim is:—

1. A device of the character described, comprising means for locating a connecting rod by reference to one of the bearings thereof, means pivotally mounted upon said first mentioned means adapted to be selectively brought into engagement with any desired portion of the internal surface of the other bearing of said connecting rod, and mechanism connected to said last mentioned means to be actuated thereby for indicating the degree of accuracy possessed by said connecting rod and its bearings.

2. A device of the character described, comprising means for locating a connecting rod by reference to one of its bearings, a contact element pivotally supported upon said means and adapted to be selectively brought into engagement with the internal surface of the other bearing of said connecting rod, and mechanism, including a pointer arm and a calibrated surface relatively to which said pointer arm is adapted to have movement, responsive to actuation of said contact element for indicating the degree of accuracy possessed by said connecting rod and its bearings.

3. A device of the character described, comprising means for locating a connecting rod by reference to one of its bearings, a pivotally supported member adapted to be selectively brought into linear engagement with a portion only of the internal surface of the other bearing of said connecting rod, and mechanism responsive to actuation of said pivotally supported member for indicating the degree of accuracy possessed by said connecting rod and its bearings.

4. A device of the character described, comprising means for locating a connecting rod by reference to one of its bearings, movable means supported upon said first mentioned means adapted to be selectively brought into reference with the internal surface of the other bearing of said connecting rod, and mechanism responsive to actuation of said movable means for indicating the degree of accuracy possessed by said connecting rod and its bearings, said mechanism including a pointer arm and a calibrated surface relatively to which said pointer arm is adapted to have movement.

5. A device of the character described, comprising means for locating a connecting rod by reference to one of its bearings, means arranged in predetermined relation to said mentioned bearing and adapted to be selectively brought into engagement with any desired portion of the internal surface of the other bearing of said connecting rod, and mechanism actuated by said last mentioned means for indicating the degree of accuracy possessed by said connecting rod and its bearings.

6. A device of the character described, comprising means for locating a connecting rod by reference to one of its bearings, means arranged in predetermined relation to said mentioned bearing and adapted to be selectively brought into engagement with the internal surface of the other bearing of said connecting rod, and mechanism actuated by said last mentioned means for indicating the amount of any lateral bend in either direction said connecting rod may possess in the body thereof.

7. A device of the character described, comprising means for locating a connecting rod by reference to one of its bearings, means arranged in predetermined relation to said mentioned bearing and adapted to be brought into engagement with a selected portion of the internal surface of the other bearing of said connecting rod, and mechanism actuated by said last mentioned means for indicating the degree of any torsional twist in either direction said connecting rod may possess in the body thereof.

8. A device of the character described, comprising means for locating a connecting rod by reference to one of its bearings, a member arranged in predetermined relation to said mentioned bearing and adapted to be brought into engagement with the internal surface of the other bearing of said connecting rod, a second member arranged in predetermined relation to said mentioned bearing and adapted to be brought into engagement with a different portion of the internal surface of said other bearing of the connecting rod, and mechanism adapted to be selectively actuated by said member and said second member for indicating both the degree of any lateral bend and the degree of any torsional twist in either direction said connecting rod may possess in the body thereof.

9. The combination as specified in claim 8, wherein said member and said second member are adapted to engage the internal surface of said other bearing at locations approximately 90° apart.

10. A device of the character described, comprising means for locating a connecting rod by reference to a wrist pin in the wrist pin bearing thereof, means arranged in predetermined relation to said wrist pin and adapted to be selectively brought into engagement with a portion of the internal surface of the main bearing of said connecting rod, and mechanism actuated by said last mentioned means for indicating the degree of accuracy possessed by said connecting rod and its bearings.

11. A device of the character described, comprising spaced apart, upstanding arms for supporting a connecting rod upon its wrist pin with said wrist pin resting upon said arms at locations adjacent the opposite ends of the wrist pin bearing, means for supporting said arms, means arranged in predetermined relation to said means for supporting said upstanding arms adapted to be brought into engagement with the internal surface of the main bearing of said connecting rod, and mechanism in predetermined relation to and actuated by said last mentioned means for indicating the degree of accuracy possessed by said connecting rod and its bearings.

12. A device of the character described, comprising spaced apart, upstanding arms for supporting a connecting rod upon its wrist pin with said wrist pin resting upon said arms at locations adjacent the opposite ends of the wrist pin bearing and between said wrist pin bearing and a piston in which said wrist pin is mounted, means for supporting said arms, a movable member arranged in predetermined relation to said means for supporting said upstanding arms adapted to be brought into engagement with the internal surface of the main bearing of said connecting rod, and mechanism in predetermined relation to and actuated by said movable member for indicating the degree of accuracy possessed by said connecting rod and its bearings.

13. A device of the character described, comprising means for locating a connecting rod by reference to one of its bearings, a member adapted to lie in the other bearing of said connecting rod and including pivotally supported elements arranged in angular relation to each other and longitudinally of said other bearing, said pivotally supported elements being adapted to be selectively brought into engagement with the internal surface of said other bearing, and mechanism actuated by each of said elements for indicating in the device both the amount of any lateral bend and the degree of any twist in either direction said connecting rod may possess along the body thereof.

14. A device of the character described, comprising spaced apart, upstanding arms for supporting a connecting rod upon its wrist pin with said wrist pin resting upon said arms at locations adjacent the opposite ends of the wrist pin bearing, means for supporting said arms, a member arranged in predetermined relation to said means for supporting said upstanding arms adapted to lie in the main bearing of said connecting rod and including pivotally supported elements arranged in angular relation to each other and longitudinally of said main bearing, said pivotally supported elements being adapted to be selectively brought into engagement with the internal surface of said main bearing, and mechanism actuated by each of said elements for indicating in the device both the degree of any lateral bend and the amount of any twist in either direction said connecting rod may possess along the body thereof.

15. In a device of the character described, a hollow base including a slot at its forward portion and a calibrated surface adjacent said slot, a hollow member extending upwardly from said base in spaced relation to said slot, a vertically swingable hollow arm mounted upon said hollow member, a contact element carrying member upon said hollow arm, a pair of contact elements pivotally supported upon said carrying member, a pair of pivoted pieces, including a pivoted piece engaged with each of said contact elements, a lever mounted in said hollow arm at location intermediate its length, adjusting screws carried by one leg of said lever, each of said pivoted pieces having engagement with one of said adjusting screws, a rod slidably mounted in said hollow member and said hollow arm and arranged axially of said arm, the other leg of said lever having engagement with one end of said rod, a second lever mounted in said hollow member at location intermediate its length, the other end of said rod having engagement with a leg of said second lever, a vertically supported pin rotatably mounted in said hollow base, a pointer arm carried by said pin and extending through said slot, a lug upon said pointer arm at the side of said pin opposite said slot and engaged by the other leg of said second lever, a pointer on said pointer arm having reference to said calibrated surface, and a spring attached to said pointer arm.

16. In a device of the character described, a pair of wrist pin supporting members adjustable from and toward each other, said members including upstanding knife edges of V-shape adapted to fit upon a wrist pin at the opposite ends of a wrist pin bearing and between said bearing and a piston carried by said wrist pin, and means for locating said wrist pin supporting members in desired relation to each other.

17. A device of the character described, comprising means for locating a connecting rod by reference to one of its bearings, means adapted to be selectively brought into engagement with different portions of the internal surface of the other bearing of said connecting rod, and mechanism actuated by said means when engaged with said internal surface for indicating the degree of accuracy possessed by said connecting rod and its bearings.

18. A device of the character described, comprising means for locating a connecting rod by reference to one of its bearings, means arranged in predetermined relation to said first mentioned means adapted to be brought into selective engagement with a portion only of the annular, internal surface of the other bearing of said connecting rod, and mechanism arranged in predetermined relation to and actuated by said last mentioned means for indicating the degree of accuracy possessed by said connecting rod and its bearings.

EWALD A. ARP.